United States Patent [19]

Dreschmann et al.

[11] Patent Number: 4,695,062
[45] Date of Patent: Sep. 22, 1987

[54] PRESSURE RELIEVING SEALING RINGS FOR ROTATING ELEMENTS

[75] Inventors: Peter Dreschmann, Dittelbrunn; Wilhelm Walter, Reith, both of Fed. Rep. of Germany

[73] Assignee: FAG Kugelfischer Georg Schafer (KGaA), Fed. Rep. of Germany

[21] Appl. No.: 890,002

[22] Filed: Jul. 25, 1986

[30] Foreign Application Priority Data

Aug. 13, 1985 [DE] Fed. Rep. of Germany ....... 3528961

[51] Int. Cl.$^4$ .......................... F16J 15/32; F16J 15/48
[52] U.S. Cl. ......................................... 277/27; 277/50;
277/58; 277/84; 277/152
[58] Field of Search ..................... 277/27, 35, 47, 50,
277/58, 63, 84, 152, 153

[56] References Cited

U.S. PATENT DOCUMENTS

| 3,438,639 | 4/1969 | Paulsen | 277/84 |
| 4,325,591 | 4/1982 | Otto | 277/50 X |
| 4,428,630 | 1/1984 | Folger et al. | 277/47 X |
| 4,476,772 | 10/1984 | Gorman et al. | 277/58 X |

FOREIGN PATENT DOCUMENTS

| 1017868 | 10/1957 | Fed. Rep. of Germany | 277/84 |
| 2161845 | 10/1980 | Fed. Rep. of Germany | |
| 1139430 | 2/1957 | France | 277/153 |
| 1150516 | 8/1957 | France | 277/47 |
| 1531683 | 5/1968 | France | 277/153 |
| 58-99560 | 6/1983 | Japan | 277/153 |
| 59-97366 | 6/1984 | Japan | 277/27 |
| 700811 | 12/1953 | United Kingdom | 277/152 |
| 1202061 | 8/1970 | United Kingdom | 277/58 |
| 1455326 | 11/1976 | United Kingdom | 277/153 |
| 2076906 | 12/1981 | United Kingdom | 277/84 |

Primary Examiner—Robert S. Ward
Attorney, Agent, or Firm—Ostrolink, Faber, Gerb & Soffen

[57] ABSTRACT

An arrangement for sealing a space having therein rotating means, such as a roller bearing, is provided with sealing rings that are spaced along a rotational axis. The inner annular sealing edges of the sealing rings are biased to engage and seal in against seats that are moving relative to the sealing edges. The seats and sealing edges are disposed so that one or the other of the latter lifts off of its seat to permit pressure within the space to equalize automatically with ambient pressure whether the latter rises or falls relative to pressure within the space.

13 Claims, 4 Drawing Figures

PRESSURE RELIEVING SEALING RINGS FOR ROTATING ELEMENTS

BACKGROUND OF THE INVENTION

Generally, this invention relates to working seals between relatively rotating machine elements and in particular relates to an arrangement for automatically equalizing pressure on opposite sides of the seals regardless of which side of the seal is subjected to a relatively rising or lowering pressure. More particularly, this invention is an improvement of the sealing arrangement disclosed in the Federal Republic of Germany Patent No. 21 61 845.

For many applications of ball and roller bearings it is necessary to seal the relatively moving or working surfaces against outside contaminants. For this purpose the prior art has utilized seals in which there are small holes or labyrinths so that pressure equalization takes place under all operating conditions without the necessity of having continuous large openings. In such or similar embodiments, the vent openings can easily become clogged by dirt and grease residues. As will hereinafter be seen, this danger is not present in the case of sealing means constructed in accordance with the instant invention since in the latter pressure equalization takes place where there is always relative movement between the sealing lips and the mating travelling surfaces. This prevents dirt buildup.

For some applications, for instance in oillubricated gears, a further sealing element must be provided with oil behind the bearing which is sealed off on both sides. With previously known sealing arrangements it was not possible to provide a sufficient supply of oil since targeted conveyance of oil through the bearing was not possible. As will hereinafter be seen, with the oriented sealing lip arrangement of the instant invention, a further sealing element is not required for oiling in that the sealing lips convey small amounts of oil during the short periods the sealing lips lift off from the mating travel surface as a result of pressure changes. During these short periods of seal lift-off, oil is transported in a purposeful manner from one seal element to the other and through the elements, such as gears and bearings, in the space between these seal elements. In this case, the sealing elements perform a filtering function, by blocking movement of dirt particles thereby increasing bearing life.

BRIEF DESCRIPTION OF THE INVENTION

In accordance with the instant invention a pressure relieving sealing arrangement for a bearing having rolling elements includes axially spaced sealing units that partially define the space through which the rolling elements move between inner and outer raceway members, one of which rotates while the other is stationary. The sealing units are rings that are secured to a first raceway element and each sealing element has an annular resilient portion or lip that is biased into sealing engagement with a second raceway element. These lips are arranged so that pressure equalization takes place whether there is a rise or fall of ambient pressure relative to pressure within the space, and this action occurs without causing a material increase of sealing friction.

Since the instant invention provides appropriately disposed sealing rings on both sides of the bearing space, one sealing lip is at all times so directed that, upon differences in pressure, there is brief lifting of the sealing lip from its seat.

In one embodiment of our sealing arrangement, oblique sealing lips are directed in the same direction and biased to normally lie against moving cylindrical seats. Regardless of the variation in pressure conditions, one sealing lip can always lift off from its seat. Furthermore, with such seals it is possible to convey oil through the bearing from the one side to the other side thereof. For this purpose, it is merely necessary that the entrance angle between the free end of the sealing lip and its seat be smaller than the exit angle between the free end of the sealing lip and its seat. Even without lifting of the the sealing lips for pressure equalization, passage of oil takes place from outside the sealed space through the seals and bearing.

In some embodiments of this invention, each sealing ring is bifurcated along one edge to provide two sealing lips only one of which, in a given installation, is positioned to function as a seal that is biased to engage a seating surface. The other lip is disposed in a clearance groove and the seating surface either partly defines the groove or is adjacent thereto.

Accordingly, the primary object of the instant invention is to provide novel, simplified sealing means for a bearing space or the like, which sealing means automatically opens to equalize pressure between the space and the area immediately outside the space.

Another object is to provide sealing means of this type in which seal friction is not materially increased whether pressure within the space is being increased or decreased.

A further object is to provide sealing means of this type that comprises two identical sealing rings.

A still further object is to provide sealing means of this type which permits oil to migrate into the bearing space through one seal, then through the bearing, and then through the other sealing member to exit the bearing space.

BRIEF DESCRIPTION OF THE DRAWINGS

These objects, as well as other objects of this invention, should become readily apparent after reading the following description of the accompanying drawings in which:

In FIG. 1, like sealing lips are oriented in the same direction; in the embodiment of FIG. 2, the sealing lip is generally T-shaped; in the embodiment of FIG. 3, each sealing lip is bifurcated to provide two oblique sealing sections; and in the embodiment of FIG. 4, one bifurcated sealing lip section engages a horizontal seat and the other bifurcated sealing lip section engages a vertical seat.

DESCRIPTION OF THE PREFERRED EMBODIMENTS

Figure 1:
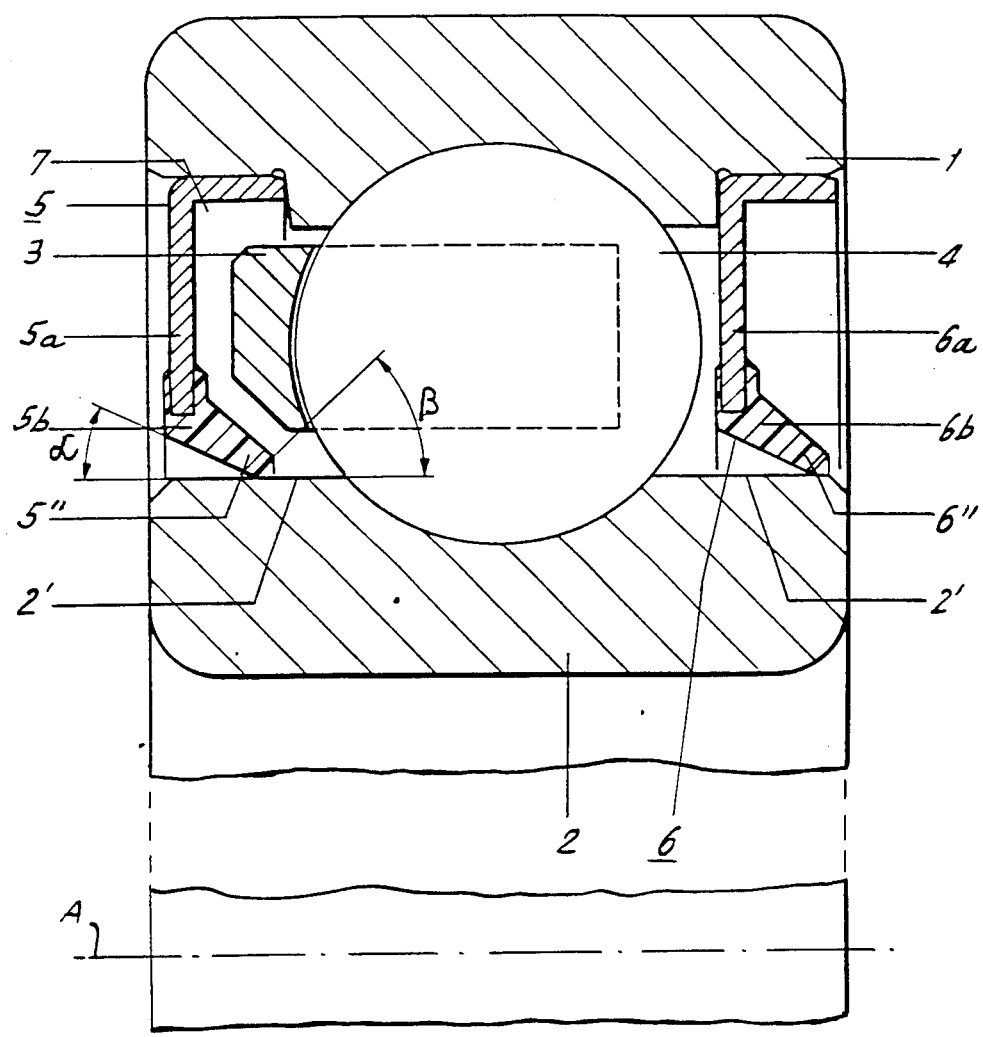
FIGS. 1–4 are fragmentary cross-sections illustrating a rotatable bearing and sealing means constructed in accordance with the teachings of the instant invention arranged to partially define a normally closed space wherein the roller elements of the bearing are disposed.

Now referring to the Figures, and more particularly to FIG. 1 which illustrates a ball bearing consisting of outer ring 1, inner ring 2, cage 3 containing balls 4 which support inner ring 2 within fixed ring 1 for rotation about axis A as a center. Two sealing rings 5 and 6 spaced along axis A partially define normally closed space 7 wherein rolling elements 4 are disposed.

Sealing rings 5,6 include metal rings 5a,6a, respectively, that are of L-shaped cross section and are secured to outer ring 1. Sealing rings 5,6 also include respective ring sections 5b and 6b of resilient material mounted to the inner edge of the respective rings 5a and 6a. The inner ends of sections 5b,6b are obliquely arranged and their lips constitute sealing lips 5" and 6" that normally rest against the circumferential seating surfaces 2' of inner ring 2. Sections 5b,6b are slightly deflected to create a self biasing force that urges lips 5",6" towards seats 2". As will hereinafter be seen, the angles or oblique positions of sealing lips 5" and 6" are identical in order to achieve one purpose of this invention.

Pressure equalization takes place upon any change in pressure inside or outside of the bearing. That is, if pressure in bearing space 7 increases, as customarily occurs because of a rise in temperature upon the starting of cold machines, sealing lip 6" on right sealing ring 6 briefly rises slightly off of seat 2', as a result of which pressure inside bearing space 7 decreases to the pressure outside of space 7. Because of this equalized pressure, there is no increase of sealing force acting on sealing lip 5" to cause an increase in sealing friction. On the other hand, if the pressure in bearing space 7 drops, for instance upon turning off of the machine (not shown) of which bearing 1-4 is a part, then left sealing lip 5" lifts off of seat 2' so that there is brief communication of space 7 with the region outside thereof to achieve pressure equalization.

Figure 2:
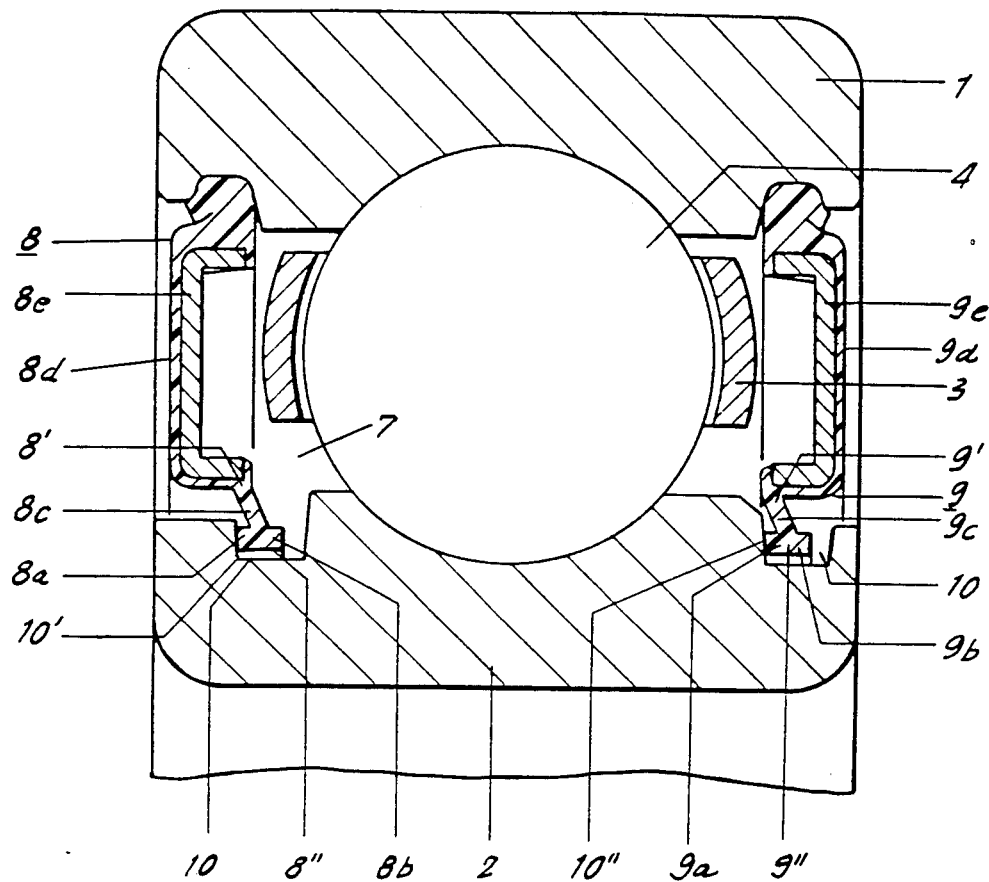

In the embodiment of FIG. 2, sealing rings 8 and 9, also secured to outer ring 1, comprise respective metal rings 8d,9d of C-shaped cross section which support respective resilient rings 8e,9e. The inner edges of rings 8e,9e are formed as respective T-shaped sealing parts 8' and 9' that are deflected so as to be self biased to the left to normally have ends 8a,9a of T-arms 8",9" engage the respective vertical sealing surfaces or seats 10',10" in annular grooves 10,10 of inner ring 2. Sealing arms 8" and 9" also have extensions 8b and 9b that are aligned with ends 9a,9b so that with the use of identical sealing rings 8,9 a functionally satisfactory application is assured on both sides of bearing 1-4. It should now be obvious that right-hand groove 10, particularly the right hand boundary wall thereof, can be eliminated and in that case, extension 9a of the sealing lip 9" will seal against the right side surface of inner ring 2. In the embodiment of FIG. 2, pressure equalization takes place in the same way as in the bearing of FIG. 1 since, here also, one of the two sealing lips 8" or 9" lifts off of its cooperating seat 10',10" as soon as there is a pressure difference between space 7 and the region outside thereof.

Figure 3:
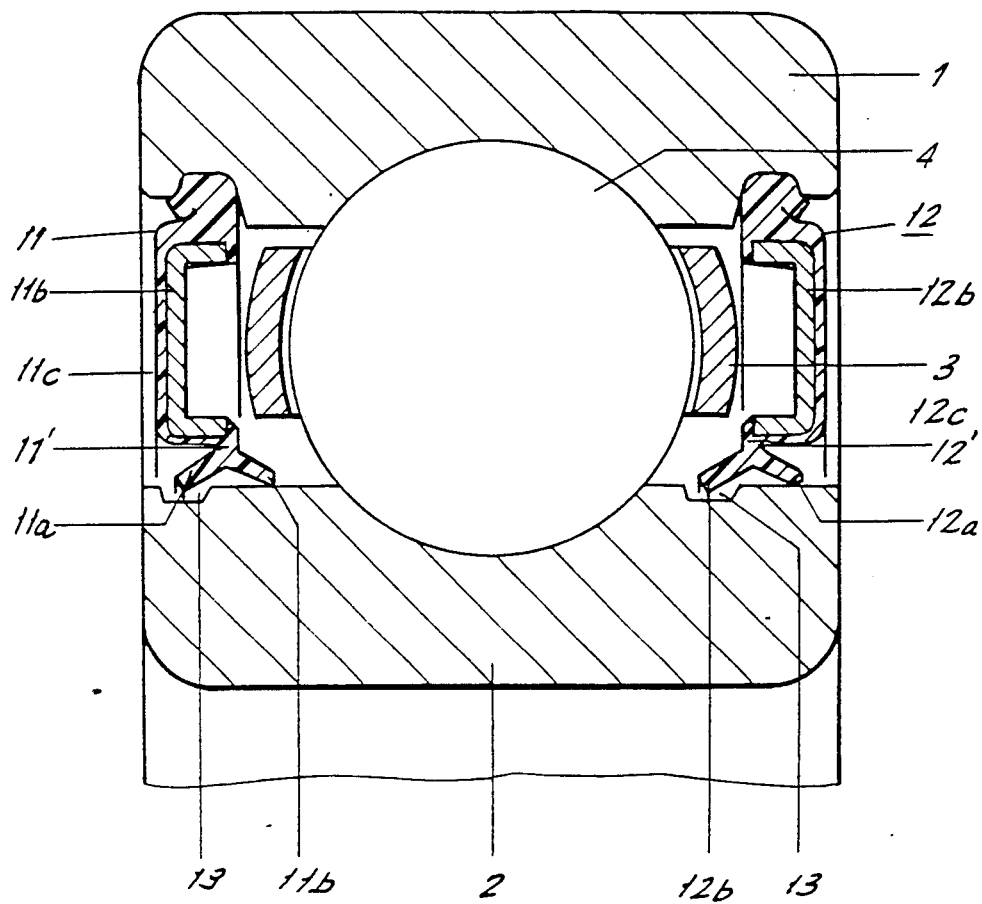
Figure 4:
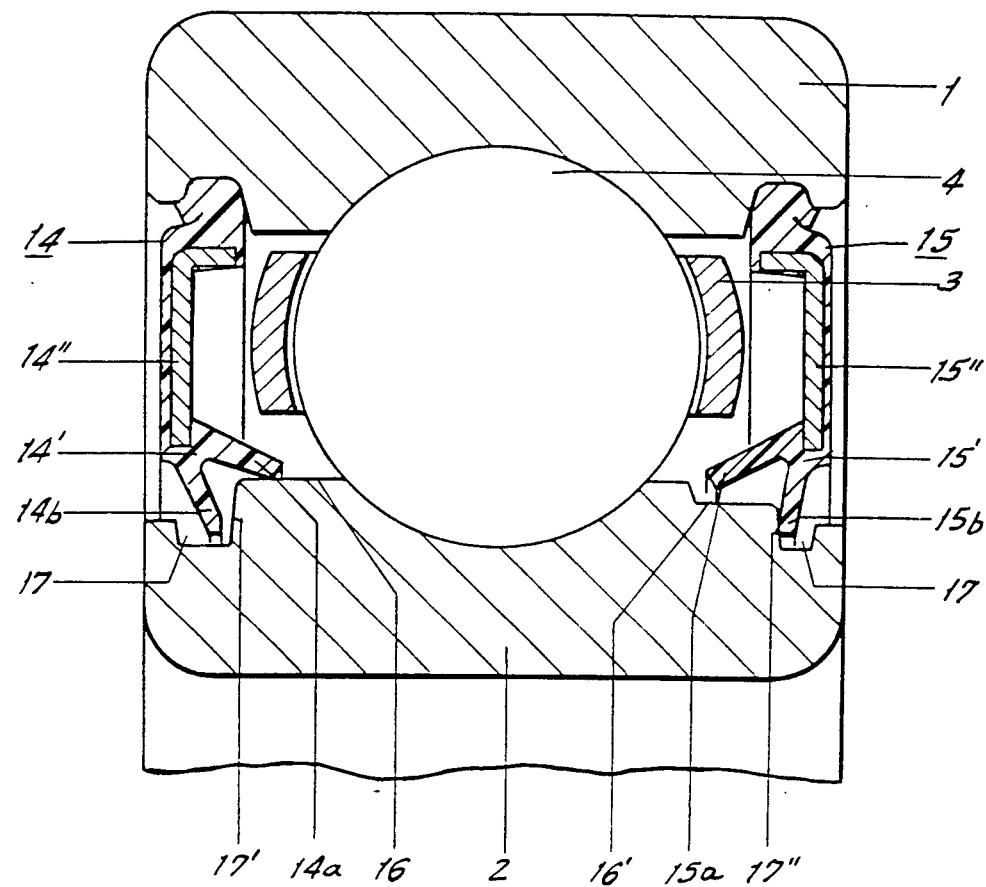

The embodiments of FIGS. 3 and 4 utilize socalled twin-lip sealilng rings. FIG. 3 illustrates ball bearing 1-4 with symmetrical twin-lip seals. Here sealing rings 11 and 12 include resilient rings 11c,12c mounted on respective metal rings 11b,12b of C-shaped cross section. The lower ends of resilient rings 11c,12c are bifurcated to form V-shaped parts 11' and 12' that provide symmetrical sealing lips 11a,11b and 12a,12b. This embodiment is similar to that of FIG. 1, the difference being that in FIG. 3 each sealing ring 11,12 includes a second obliquely directed sealing lip 11a,12b that is disposed within circumferential grooves 13 of inner ring 2 so as not to engage a seating surface.

In the embodiment of FIG. 4, the bifurcations provide asymmetrical sealing lips 14a,14b and 15a,15b in the respective sealing rings 14 and 15 that are secured to outer ring 1. Rings 14,15 include metal rings 14",15" of L-shaped cross section that support resilient sealing parts 14',15' having obliquely directed sealing lips 14a,15a, respectively. Obliquely inclined sealing lip 14a is biased against circumferential seating surface 16 of inner ring 2 while radially directed sealing lip 14b extends into groove 17 and is spaced from the side surface 17' thereof.

On the other side of the bearing 1-4 the conditions are reversed. That is, obliquely directed sealing lip 15a is spaced from cylindrical surface 16' while radially directed sealing lip 15b is biased against inner side surface 15" of groove 17. It is noted that seating shoulder 16 is of greater diameter than clearance shoulder 16' and that seating surface 17" is further from the center of balls 4 than is clearance surface 17'.

The sealing rings shown in FIGS. 1 and 3 also permit the targeted passage of oil through the ball bearing. That is, if oil is present outside of bearing space 7 in FIG. 1 at the side of the sealing ring 5 then, in operation, a small amount of oil will always be conveyed into the bearing space 7 through the obliquely inwardly directed sealing lip 5". Oil then migrates through bearing 1-4 and exits from space 7 through sealing lip 6" to the right thereof. This flow of oil occurs because upstream or entrance angle alpha ($\alpha$) for both sealing lips 5" and 6" is smaller than downstream or exit angle beta ($\beta$). The angle $\alpha$ is included between seat 2' and the incoming side of sealing tip 5" while angle $\beta$ is included between seat 2' and the outgoing side of sealing tip 5".

Although the present invention has been described in connection with a plurality of preferred embodiments thereof, many other variations and modifications will now become apparent to those skilled in the art. It is preferred, therefore, that the present invention be limited not by the specific disclosure herein, but only by the appended claims.

what is claimed is:

1. Means defining a space having first and second sealing rings at opposite sides thereof;

said means including first and second sections mounted for relative rotation therebetween, with one of said sections being disposed inside the other of said sections;

each of said sealing rings being secured to said first section and having annular resilient lip means including a sealing lip biased to engage seat means on said second section;

said sealing lips and said seat means being disposed so that in the even pressures within and without said space are unequal, at a given time the sealing lip of only one of said sealing rings separates from said seat means to equalize pressures within and without said space;

each of said sealing rings having an interior side facing said space and being subjected to pressure existing within said space;

each of said sealing rings having an exterior side facing away from said space, with both of said exterior sides being subjected to pressures that are equal;

for each of said sealing rings, said resilient lip means at its free end being bifurcated to form first and second lips;

for each of said sealing rings, one of said first and second lips constituting said sealing lip, and the other of said first and said second lips constituting a non-sealing lip that is disposed free of engagement with said first and second sections.

2. Means as in claim 1 in which the sealing lips of both the first and second sealing rings are oblique in the same direction with respect to said seating means.

3. Means as in claim 1 in which the resilient lip means are radially directed and are biased in the same direction.

4. Means as in claim 3 in which the resilient lip means at its free end is generally of T-shaped cross-section including an axially extending cross-element an end of which constitutes the sealing lip.

5. Means as in claim 3 in which the seating means are provided by flat surfaces that are in planes transverse to an axis for the relative rotation between the first and second sections.

6. Means as in claim 2 in which each of said sealing lips forms an entrance and an exit angle with respect to said seating means;

said entrance angle being upstream of said exit angle with respect to pressure equalizing flow that acts to separate the sealing lip from the seating means;

said exit angle being substantially larger than said entrance angle.

7. Means as in claim 1 in which the seating means provides an arcuate surface for engagement by the sealing lip of the first sealing ring, and the seating means provides a flat surface for engagement by the sealing lip of the second sealing ring.

8. Means as in claim 7 in which the flat surface is in a plane transverse to an axis for the relative rotation between the first and second sections; and the arcuate surface is formed about said axis as a center.

9. Means as in claim 1 in which the first and second lips are in a V-shaped configuration.

10. Means as in claim 1 in which said first and second sealing rings are of the same size and shape.

11. Means as in claim 1 in which for said first sealing ring said non-sealing lip is outside of said space, and for said second sealing ring said non-sealing lip is inside of said space.

12. Means as in claim 11 in which said first and second sealing rings are of the same size and shape.

13. Means as in claim 12 in which each of said sealing lips forms an entrance and an exit angle with respect to said seating means;

said entrance angle being upstream of said exit angle with respect to pressure equalizing flow that acts to separate the sealing lip from the seating means;

said exit angle being substantially larger than said entrance angle.

* * * * *